United States Patent
Binns et al.

(10) Patent No.: US 8,171,472 B1
(45) Date of Patent: May 1, 2012

(54) SEPARATION AND REUSE OF VERSIONS DIRECTORY IN EXECUTION FRAMEWORK INSTALLATIONS

(75) Inventors: Rex A. Binns, Kansas City, MO (US); Richard L. McCall, Wathena, KS (US); Fabio Santiago, Frisco, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1300 days.

(21) Appl. No.: 11/836,128

(22) Filed: Aug. 8, 2007

(51) Int. Cl.
*G06F 9/45* (2006.01)
(52) U.S. Cl. .................. 717/175; 717/167
(58) Field of Classification Search .......... 717/162, 717/167–169
See application file for complete search history.

(56) References Cited

U.S. PATENT DOCUMENTS

| | | | |
|---|---|---|---|
| 2002/0062451 A1* | 5/2002 | Scheidt et al. | 713/201 |
| 2002/0178271 A1* | 11/2002 | Graham et al. | 709/229 |
| 2004/0111252 A1* | 6/2004 | Burgun et al. | 703/28 |
| 2007/0083720 A1* | 4/2007 | Pullen et al. | 711/158 |
| 2008/0313313 A1* | 12/2008 | Doshi et al. | 709/221 |

* cited by examiner

*Primary Examiner* — Anna Deng

(57) ABSTRACT

A method is provided for executing multiple applications concurrently on a single computer. The method comprises discriminating static from non-static execution framework files, installing the non-static files in a first directory on a host computer, installing the non-static files in a second directory on the host computer, and installing the static files in a third directory on a server computer. The method also includes remote mounting the third directory to the host computer. The method further includes executing the first application within a first instance of the execution framework and executing the second application within a second instance of the execution framework, wherein both the first and second instances of the execution framework are based on the non-static files on the host computer and on the static files in the remote mounted third directory.

6 Claims, 6 Drawing Sheets

SEPARATION AND REUSE OF VERSIONS DIRECTORY IN EXECUTION FRAMEWORK INSTALLATIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer programs may be referred to as applications. In some cases applications may be capable of executing on any computer that has sufficient processing and memory resources. A computer suitable for executing applications may be referred to as a host computer. In some cases a host computer may call upon another computer, sometimes referred to as a server computer, to provide content or other assistance to execute applications. In some host computers multiple applications may run approximately concurrently by time sharing the central processing unit of the host computer, also referred to as multi-tasking.

Installing an application on a host computer may involve loading a variety of separate files onto the host computer and then performing additional installation procedures. The installation procedures may include executing an installation script that guides the installer through the necessary steps of configuring the host computer and installing the application. For example, the installer may need to assign an Internet Protocol address (IP Address) to the host machine. The installer may need to identify a desirable directory structure for storing the application files on a secondary storage device of the host computer, for example a disk drive.

A file system may include a high level directory and a series of subdirectories subordinate to the high level directory. The subdirectories may themselves include further subdirectories. In some operating systems, for example the UNIX operating system, it is possible to mount a file system to make that file system accessible within the subject computer system. A file system physically stored on a disk drive contained within the physical chassis of the host computer may be mounted. Additionally, a file system physically stored on a disk drive contained within the physical chassis of a computer remote from the host computer may be remotely mounted at the host computer, for example using the Network File System (NFS) mount command in the UNIX operating system, thereby making the file system stored on the disk drive contained within the remote computer accessible to the host computer as if it were a local rather than a remote disk.

SUMMARY

In an embodiment, a method is provided for executing a plurality of computer applications on a single computer. The method comprises discriminating static from non-static execution framework files, installing the non-static files in a first directory on a host computer, installing the non-static files in a second directory on the host computer, installing the static files in a third directory on a server computer, where the server computer is different from the host computer. The method also includes remote mounting the third directory to the host computer. The method further includes executing the first application within a first instance of the execution framework, where the first instance of the execution framework is based on the non-static files in the first directory on the host computer and the remote mounted third directory. The method also includes executing the second application within a second instance of the execution framework, where the second instance of the execution framework is based on the non-static files in the second directory on the host computer and the remote mounted third directory. Both the first and second instances of the execution framework execute concurrently after they are launched or started.

In another embodiment, a method of building a plurality of host computers is provided. The method includes installing a plurality of configuration execution framework files on a first host computer, installing a plurality of configuration execution framework files on a second host computer, installing a plurality of binary execution framework files on a server computer, remotely mounting the binary execution framework files to the first host computer, and remotely mounting the binary execution framework files to the second host computer.

In another embodiment, a system for testing a plurality of applications is provided. The system comprises a server computer containing a plurality of static binaries of an execution framework and a plurality of host computers. Each host computer remotely mounts the binary files from the server computer and executes one or more applications. Each of the applications executes on the host computers within an instance of the execution framework, wherein each instance of the execution framework is based at least in part on the static binaries on the server computer and in part on a plurality of non-static configuration files on the host computer.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Computer applications may be executed within a framework, for example Java byte code may execute within a JAVA virtual machine (JVM) provided as an execution framework by a third party vendor. A variety of these third party execution frameworks are commercially available, including WEBLOGIC, WEBSPHERE, IPLANET, TOMCAT, JBOSS, and others. An installation of an execution framework on a host computer, for example a computer configured to execute a computer application, may consume a substantial quantity of the memory available on the host computer, for example the Random Access Memory (RAM), thereby limiting the capacity of the host computer to execute additional applications. While high-end computer systems may be amply configured with more RAM than can readily be fully utilized, in some installations low-end computer systems configured with a minimal amount of RAM may be employed to keep costs down.

In several embodiments of the present disclosure a novel method of installing execution frameworks is described which has enabled an enterprise to run several applications within execution frameworks concurrently on the same low cost host computer, thereby significantly reducing computer environment costs. The novel method includes separating non-static framework files, also called configuration framework files, from static framework files, also known as binary framework files and/or static binary framework files. The non-static framework files are copied and installed for each framework execution environment on the host computer. The static framework files, however, are stored on a separate computer system, which may be referred to herein as a golden server, and the host computer remotely mounts the directory on the golden server that contains the static framework files to the host computer, thereby conserving the local host memory that would otherwise be consumed by each framework execution environment on the host maintaining a separate copy of the static framework files.

Figure 1:
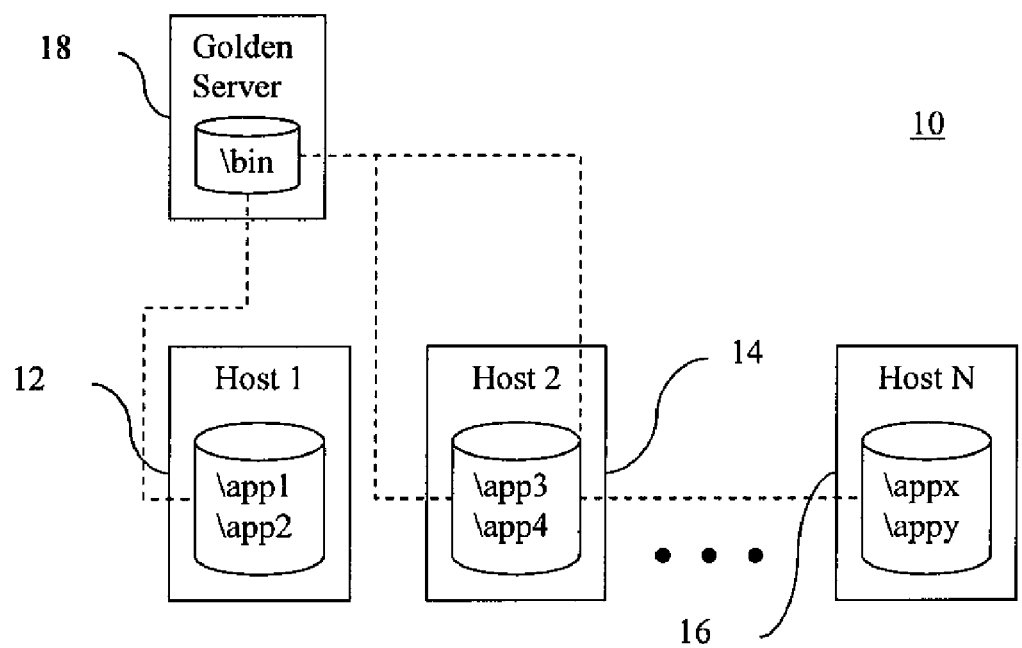
FIG. 1 illustrates a plurality of host computers that execute applications and remotely mount a directory on a server in accordance with several embodiments of the disclosure.

FIG. 1 depicts an exemplary computer system 10 according to several embodiments of this disclosure. The computer system 10 includes a plurality of host computers, a first host computer 12, a second host computer 14, and an N-th host computer 16. Each of the host computers 12-16 executes one or more computer applications or programs. While each host computer 12-16 is illustrated as executing two applications, it is understood that in an embodiment either fewer or more applications may execute on the host computers 12-16. The number of applications executing on the host computers 12-16 may be determined based on the processing capacity of the host computers 12-16 and on the processing load of the subject applications, for example to achieve an average central processing unit (CPU) load of 85%. Under loading the host computers 12-16, for example maintaining an average CPU load of 15% or less, may be inefficient and result in excessive costs from maintaining additional host computers and from paying additional software licensing fees for the additional host computers. Over loading the host computers 12-16 may cause degradation of computing performance of the host computers 12-16. The host computers 12-16 may be any general purpose computer, and general purpose computers are discussed more fully with reference to FIG. 6 later in this disclosure. In an exemplary environment for testing applications, the host computers 12-16 are low cost computers with two CPUs per computer.

The computer system 10 also includes one or more server computers 18, also known as a golden server. The server computer 18 contains a directory that contains a portion of the files of an execution framework, contained for example in a directory named \bin. The framework files contained or stored by the server computer 18 are the static framework files of the execution framework. These static framework files are distinguished from other framework files which change as a result of installation of the framework. These other framework files are referred to as non-static framework files. These non-static framework files, which may also be referred to as configuration framework files, change in one or more ways during the framework installation process, for example changing file permissions.

The host computer 12 executes the application 1 in an instance of the execution framework that depends upon non-static framework files and static framework files. The non-static framework files associated with the instance of the execution framework in which application 1 executes are installed on the host computer 12 in a first memory segment or portion or area dedicated for application 1. The static framework files associated with the instance of the execution framework in which application 1 executes are made accessible by remotely mounting the directory containing these static framework files, for example the \bin directory, from the server computer 18 to the host computer 12. The remote mounting may be accomplished by, for example, using the NFS mount command of the UNIX operating system or some other appropriate operating system command.

The non-static framework files associated with an instance of the execution framework in which application 2 executes are installed on the host computer 12 in a second memory segment or portion or area dedicated for application 2. The static framework files associated with the instance of the execution framework in which application 2 executes are the same static framework files already mounted from the server computer 18. Note that the two instances of the execution framework executing application 1 and application 2, respectively, on the host computer 12 do not load the entire body of static framework files into their respective memory segments but only access those portions of the static framework files as needed, thereby conserving memory in the host computer 12. The instances of the execution frameworks in which the applications execute on the host computer 14 and the host computer 16 are similarly composed in part of memory segments dedicated to each application that contain the non-static framework files and the portion of the static framework files referenced as needed from the remotely mounted static framework files stored on the server computer 18.

In some embodiments an application may be installed and execute concurrently on more than one of the host computers 12-16, for example an application may execute concurrently on both the host computer 12 and the host computer 14. In some embodiments the static framework files stored or contained by the server computer 18 may be locked down, meaning that the static framework files are configured to be read-only. In some embodiments the entire server computer 18 may be configured to permit only read access to the host computers 12-16. The server computer 18 may be referred to as a golden server because the contents of its file systems or its memory storage has been locked down.

In an embodiment an application may be launched or started within an instance of the execution framework with a command such as jvm –m 256, 256 <application name>, where it is understood the subject application name is substituted for <application name>. This execution command may reduce garbage collection or other memory management activities of the execution framework at inopportune times or for excessive time durations. More generally, the effect of this specific command is to specify explicitly a memory size allocation for the instance of the execution framework; in particular execution frameworks, other expressions directed to explicitly specifying the memory size allocation for the instances of the execution framework may be employed.

In an embodiment, the system 10 may comprise a plurality of low cost host computers 12-16 that are configured with two CPUs and that execute the UNIX operating system. The host computers 12-16 are configured to run applications that are being tested, for example JAVA byte code. The host computers 12-16 are configured to execute the applications in a JAVA Virtual Machine (JVM), for example a WEBLOGIC JVM, while mounting the static WEBLOGIC binaries from the server computer 18. The non-static WEBLOGIC files, for example configuration files, are stored on the host computers 12-16. The static WEBLOGIC binaries are stored in a read-only directory on the server computer 18. In an embodiment, each of the applications that are being tested are installed and run on two of the host computers 12-16. The applications may be launched on the host computers 12-16 with the command jvm –m 256, 256 <application name>.

This novel system and method for executing applications can be readily extended by those skilled in the art to any application that executes inside an application framework. These and other applications can be executed in other JVM execution frameworks, for example, WEBSPHERE, TOMCAT, JBOSS, and others, using the system and methods set forth in this disclosure. In an embodiment, the disclosed method of executing applications may not be operable on a computer system executing the MICROSOFT WINDOWS operating system.

Figure 2:
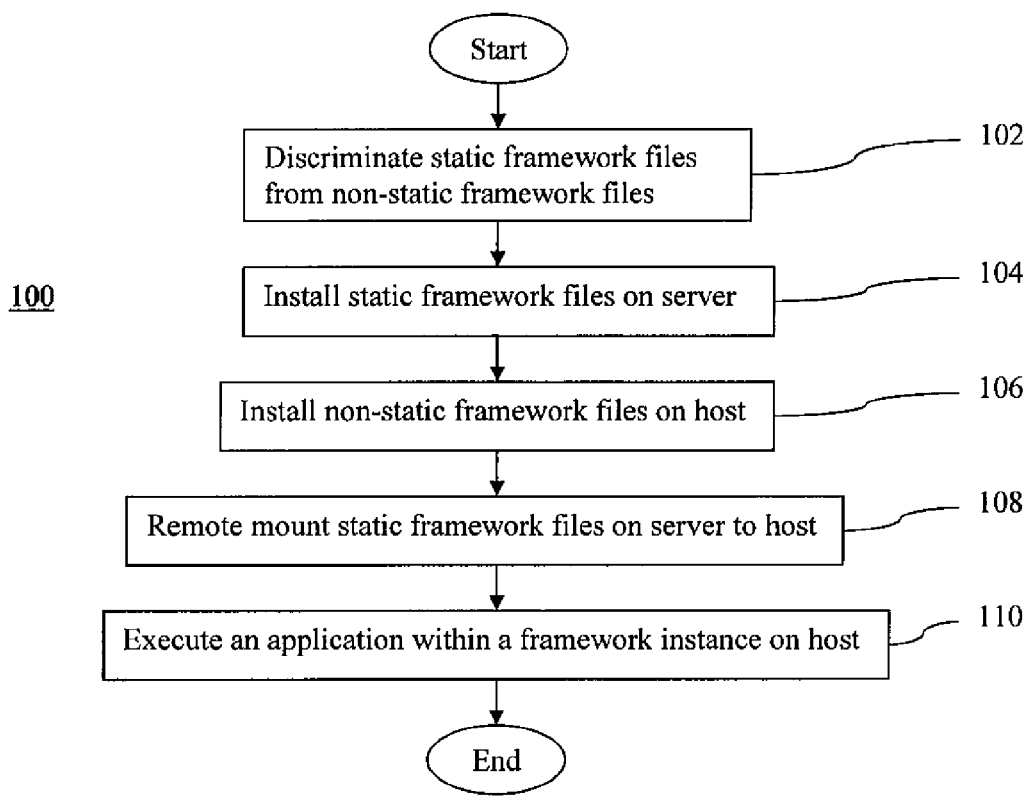
FIG. 2 is a flow chart of a method for executing an application within a framework program, wherein the static framework files are remotely mounted, in accordance with one or more embodiments of the disclosure.

Turning now to FIG. 2, a method 100 of installing the execution framework and executing an application within an instance of the execution framework is depicted. In block 102 the static or binary framework files are discriminated, differentiated, or distinguished from the non-static framework files. How the static framework files are distinguished from the non-static framework files will be discussed further with reference to FIG. 4 below. In block 104 the static framework files are installed on a server computer, for example in a single directory. While the directory may be variously named, the installation procedures for a particular execution framework may advise a particular directory name be employed, for example \bin. Static framework files may also be referred to as static binary framework files.

In block 106 the non-static framework files are installed on the host computer, for example the host computer 12. The installation of the non-static framework files may be accomplished partially using an installation program provided by a third party vendor of the framework. The installation procedure may be repeated several times on the host computer 12 if several applications are to be executed concurrently on the host computer 12, for example in different instances of the execution framework. It will be readily appreciated that it makes no difference whether block 106 is performed before or after block 104.

In block 108 the static framework files on the server are made accessible to the host computer by remotely mounting the directory containing the static framework files. This may be accomplished in a UNIX or similar environment by remotely mounting the file system that contains the static framework files, for example the \bin directory. Mounting file systems is well known to those skilled in the art, particularly to computer system adminstrators and UNIX systems administrators. Mounting a file system generally allows a computer system to interact with memory storage logically, by naming file systems and branches or directories of file systems, rather than interacting with memory storage physically by naming disk drives and other physical resources. As a result of remotely mounting the static framework files from the server to the host computer, for example from the server computer 18 to the host computer 12, the static framework files on the server are visible or accessible from the host computer. It will be readily appreciated that block 108 may be performed before or after block 104.

In block 110 an application is executed inside an instance of the execution framework on the host computer, for example application 1 on the host computer 12. This may involve launching the application inside an instance of the execution framework in a memory segment allocated to or dedicated to the subject application on the host computer. As the execution framework executes the application, the framework activity is based not only upon the non-static execution framework files associated with the instance of the execution framework, but also based on the static files stored on or in the server, for example the server computer 18. Only the small portion of the static files that are needed at a particular time are loaded into the application's memory segment, thereby saving considerable memory that would otherwise be consumed by loading all the static execution framework files.

In the host computer multiple separate applications may execute concurrently by time sharing the CPU(s) of the host computer. This sharing of the CPU(s) is also referred to as multitasking. In this case, each separate application executes inside an instance of the execution framework in a separate memory segment dedicated to each separate application, and each separate instance of the execution framework loads only the immediately needed portion of the static execution framework files into its associated memory segment.

Figure 3:
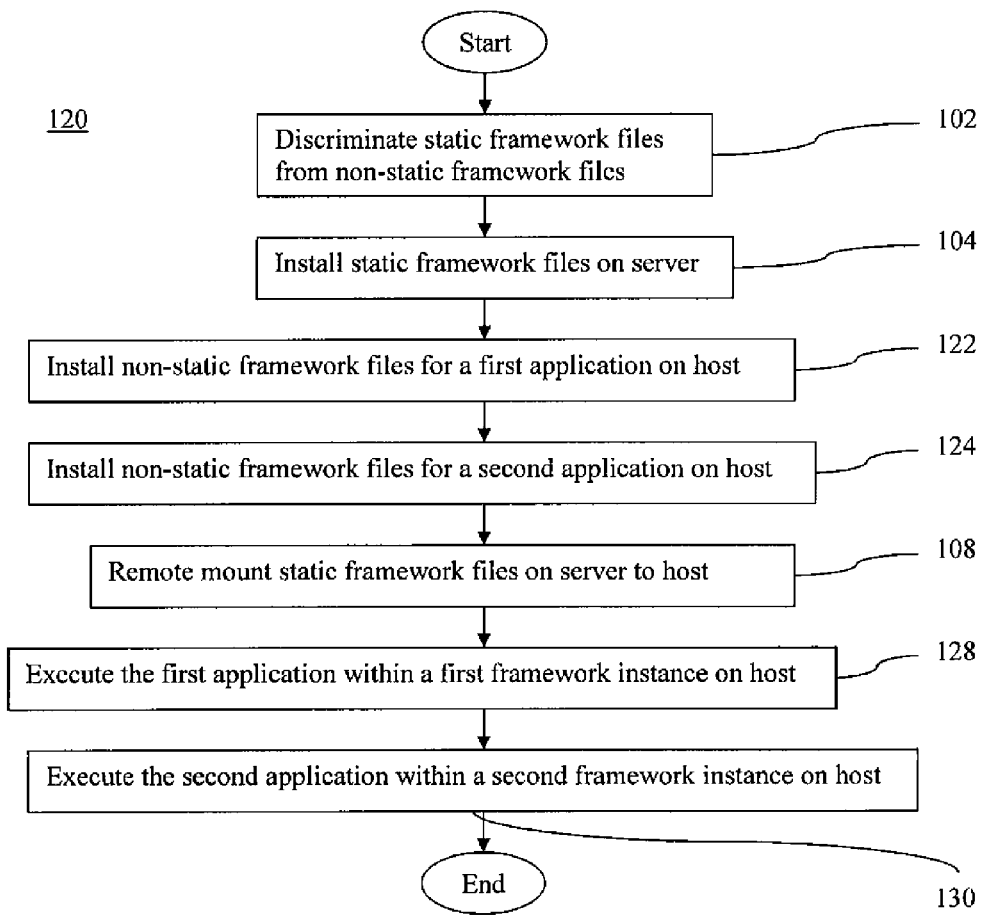
FIG. 3 is a flow chart of a method for executing a first application within a first instance of an execution framework on a host computer and executing a second application within a second instance of the execution framework on the host computer, wherein the host computer remotely mounts a plurality of static framework files from a server, in accordance with one or more embodiments of the disclosure.

Turning now to FIG. 3, a method 120 of installing the execution framework and executing two applications concurrently within separate instances of the execution framework is depicted. This method is closely related to the method depicted in FIG. 2 and will reuse some of the procedural steps of the method of FIG. 2. In block 102 the static or binary framework files are discriminated or distinguished from the non-static framework files. In block 104 the static framework files are installed on a server computer, for example in a single directory.

In block 122 the non-static framework files are installed for a first application on the host computer, for example the host computer 12. In block 124 the non-static framework files are installed for a second application on the host computer, for example the host computer 12. These separate installations of non-static framework files may be stored in separate directory structures on the host computer. In block 108 the static framework files on the server are made accessible to the host computer by remotely mounting the directory containing the static framework files.

In block 128 the first application is executed inside a first instance of the execution framework on the host computer, for example application 1 on the host computer 12. In block 130 the second application is executed inside a second instance of the execution framework on the host computer, for example application 2 on the host computer 12. As the execution framework executes the two applications, the framework activity is based not only upon the non-static execution framework files associated with the two instances of the execution framework, but also based on the static files stored on or in the server, for example the server computer 18. Only the small portion of the static files that are needed at a particular time are loaded into each application's memory segment, thereby saving considerable memory that would otherwise be consumed by loading all the static execution framework files.

Figure 4:
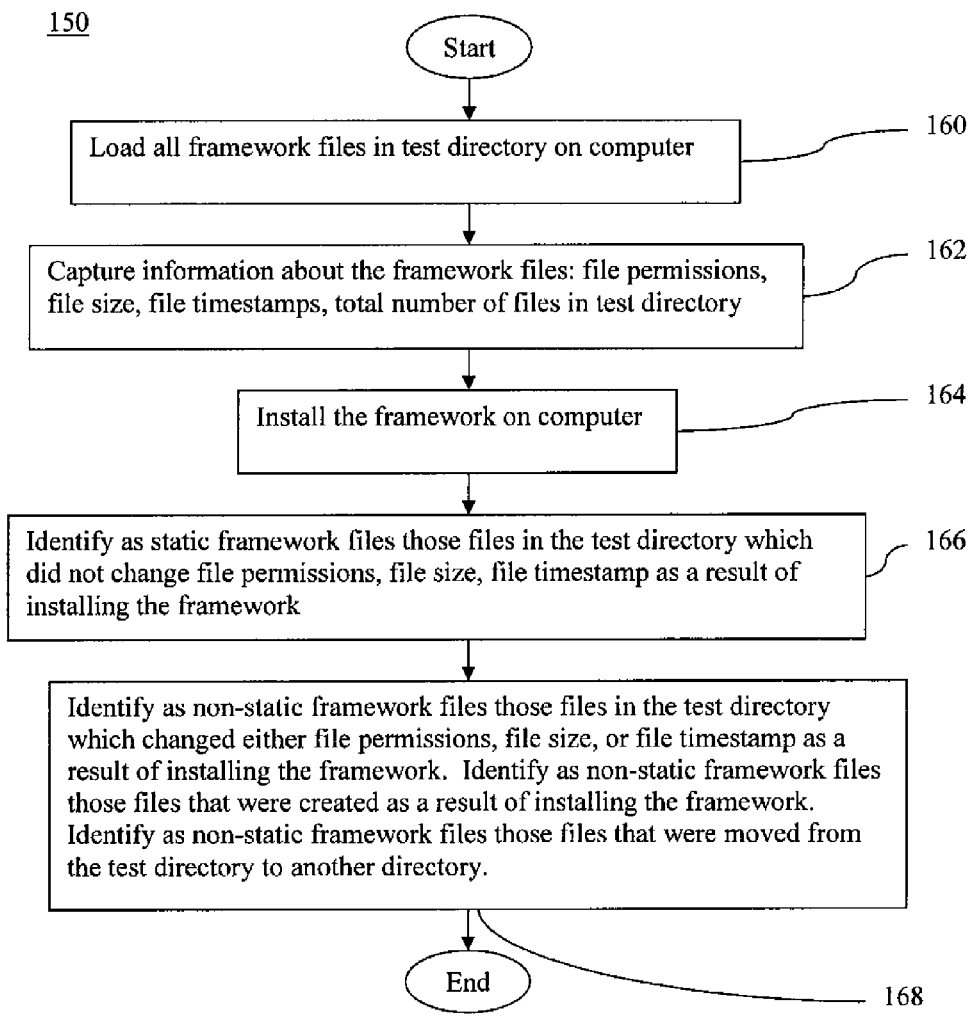
FIG. 4 is a flow chart of a method for discriminating static framework files from non-static framework files in accordance with several embodiments of the disclosure.

Turning now to FIG. 4, a method 150 of discriminating or distinguishing non-static execution framework files from static execution framework files is described. In block 160 all execution framework files are copied or loaded into a test directory on a computer. In block 162 information about the execution framework files copied into the test directory are captured. This information may include timestamps of the execution framework files, memory size consumed by the execution framework files, access permissions of the execution framework files, and other related information. This information may be captured in various manners including automated computer programs or scripts.

In block 164 the execution framework is installed on the computer. The installation may follow standard installation practices recommended by third party vendors of the execution framework.

In blocks 166 and block 168 the state of the test directory, other memory storage on the computer, and the state of the files are analyzed to determine what changes have occurred. Those files which did not change in any way are deemed static execution framework files, and those files which did change in some way are deemed non-static execution framework files. More specifically, in block 166 those files in the test directory which did not change in size, in timestamp, or in permissions are deemed to be static execution framework files. These static execution framework files may also be referred to as binary execution framework files, although these files need not be binary files as long as they are static and unchanged through the framework installation process. In block 166, those files in the test directory which changed in one or more of their permissions, size, or timestamp; those files moved out of the test directory to a different directory; and any files created during the installation process are all deemed to be non-static execution framework files. The non-static execution framework files may be referred to as configuration execution framework files. Again, the analysis process may be conducted in various manners, including by a computer program or script.

Figure 5:
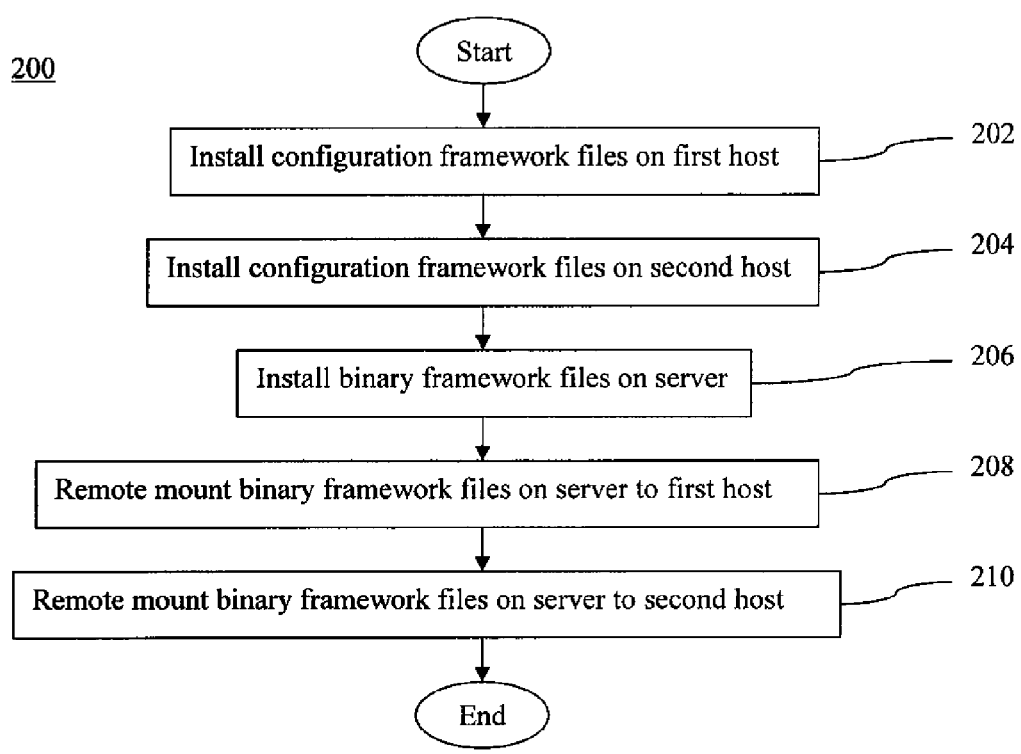
FIG. 5 is a flow chart of a method for building a plurality of host computers, wherein each host computer is configured to execute applications within an instance of an execution framework and wherein the host computers remotely mount binary framework files from a server computer in accordance with several embodiments of the disclosure.

Turning now to FIG. 5, a method 200 of building a plurality of host computers is described. In block 202 configuration framework files are installed on a first host computer, for example the host computer 12. In block 204 configuration framework files are installed on a second host computer, for example the host computer 14.

In block 206 binary framework files are installed on a server computer, for example the server computer 18. In block 208 remote mount the binary framework files on the server computer to the first host computer, for example remote mount the binary framework files on the server computer 18 to the host computer 12. In block 210 remote mount the binary framework files on the server computer to the second host computer, for example remote mount the binary framework files on the server computer 18 to the host computer 14.

Figure 6:
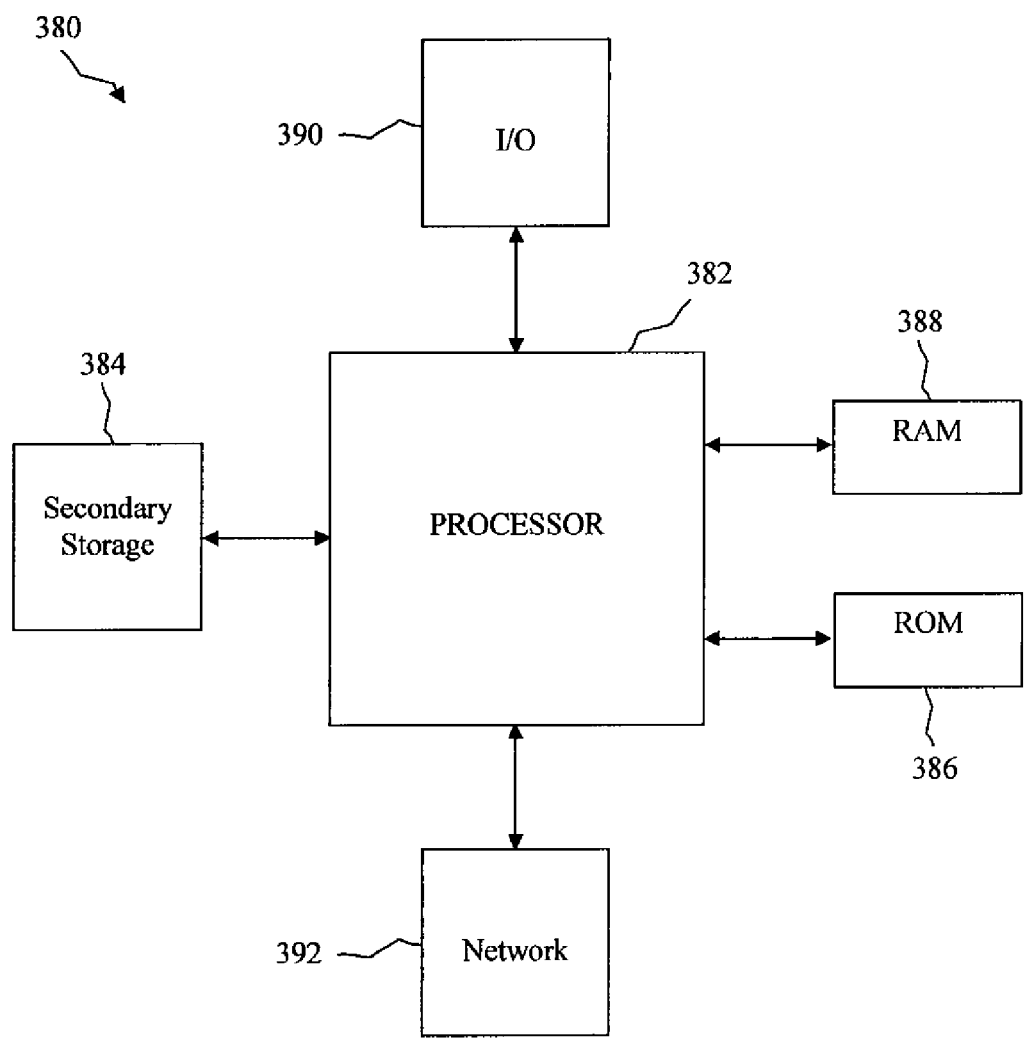
FIG. 6 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, ethernet cards, universal serial bus (USB) interface cards, serial interfaces, token ring cards, fiber distributed data interface (FDDI) cards, wireless local area network (MAN) cards, radio transceiver cards such as code division multiple access (CDMA) and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

In an embodiment, the disclosed method of installing execution frameworks may be used in an application testing environment, as well as in other environments. In one application testing environment inexpensive computers may be used to reduce costs. It may be desirable to load the computers near their maximum capacities to both reduce the cost of the installed base of testing computers and to reduce the cost of associated software licenses. The disclosed method of installing execution frameworks supports this objective, in some embodiments, by permitting a plurality of applications to execute concurrently on the same computer by remotely mounting the execution framework from a golden server, as described above. As such, the present framework may support rapid set up of a test environment for an application. Because much of the execution framework is already installed on the golden server, the set up time to configure the testing computers to execute the applications under test may be reduced.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of executing a plurality of applications, comprising:
    discriminating static files from non-static files of an execution framework, wherein the discriminating include:
        loading all framework files in a directory on a computer;
        capturing information about the framework files including a permissions of the files, a storage size of the files, and the number of files in the directory;
        installing the execution framework on the computer;
        identifying as the static files those files in the directory which were originally loaded in the directory, did not experience permissions changes as a result of installing, and did not change file storage size as a result of installing; and
        identifying as the non-static files those files in the directory that experienced a file storage size change as a result of installing, those files in the directory that were created as a result of installing, those files originally in the directory that were moved outside of the directory as a result of installing, and those files created outside of the directory as a result of installing;
    installing the non-static files in a first directory on a host computer;
    installing the non-static files in a second directory on the host computer;
    installing the static files in a third directory on a server computer, the server computer being different from the host computer;
    remote mounting the third directory at the host computer;
    executing a first application within a first instance of the execution framework on the host computer, based on the non-static files in the first directory on the host computer and the remote mounted third directory; and
    executing a second application within a second instance of the execution framework on the host computer, based on the non-static files in the second directory on the host computer and the remote mounted third directory.

2. The method of claim 1 wherein the execution framework is a JAVA virtual machine.

3. The method of claim 2 wherein the execution framework is one of a WEBLOGIC, a WEBSPHERE, an IPLANET, a JBOSS, or a TOMCAT JAVA virtual machine.

4. The method of claim 2 wherein the execution framework is a WEBLOGIC JAVA virtual machine and wherein the executing the first and second applications is initiated by executing a command formatted in part as "jvm −m 256, 256 <application name>", wherein the name of the application is substituted for <application name>.

5. The method of claim 1, further including making the third directory read only to the host computer.

6. The method of claim 1, further including:
    installing the non-static files in a third directory on the host computer;
    installing the non-static files in a fourth directory on the host computer;
    executing a third application within a third instance of the execution framework on the host computer, based on the non-static files in the third directory on the host computer and the remote mounted third directory; and
    executing a fourth application within a fourth instance of the execution framework on the host computer, based on the non-static files in the fourth directory on the host computer and the remote mounted third directory.

* * * * *